(12) United States Patent
Bogdan et al.

(10) Patent No.: US 6,223,517 B1
(45) Date of Patent: May 1, 2001

(54) CONNECTING CHAIN LINK

(75) Inventors: Zvonimir Bogdan, Abtsgmünd; Hans-Jürgen Scherle, Aalen, both of (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/525,496

(22) Filed: Mar. 15, 2000

(30) Foreign Application Priority Data

Mar. 19, 1999 (DE) .............................................. 199 14 015

(51) Int. Cl.[7] ........................................................ F16G 15/04
(52) U.S. Cl. ............................................. 59/85; 59/84
(58) Field of Search ......................... 59/78, 84, 85, 59/86, 87, 88

(56) References Cited

U.S. PATENT DOCUMENTS

| | | | | |
|---|---|---|---|---|
| 859,082 | * | 7/1907 | Kenter | 59/85 |
| 2,525,724 | * | 10/1950 | Robbins | 59/85 |
| 2,761,275 | * | 9/1956 | Robbins | 59/85 |
| 2,819,586 | * | 1/1958 | Pierre | 59/85 |
| 2,979,886 | * | 4/1961 | Robbins | 59/85 |
| 4,090,357 | * | 5/1978 | Smith | 59/85 |
| 4,505,103 | * | 3/1985 | Dlaferth et al. | 59/85 |
| 6,021,634 | * | 2/2000 | Brodziak | 59/85 |

FOREIGN PATENT DOCUMENTS

| | | |
|---|---|---|
| 7435053 | 5/1976 | (DE) . |
| 298 11 33 U | 2/1998 | (DE) . |

* cited by examiner

*Primary Examiner*—David Jones
(74) *Attorney, Agent, or Firm*—Mark P. Stone

(57) ABSTRACT

In the case of a connecting chain link for link chains having two connecting-link parts (1, 2), their ends (4, 5), which are connected to each other via a respective longitudinal web (3), are held together in the closed position by means of a respective stub (6) gripping into a pocket (7). While each stub (6) is provided with an essentially U-shaped retaining web (19) which has clearances (22, 23) in the region of its limbs (20, 21) running parallel to each other, each pocket (7) is provided with a U-shaped retaining groove (25) whose one wall (24) has recesses (26, 27). The size and position of the clearances (22, 23) and of the recesses (26, 27) make it possible for the connecting-link parts (1, 2) to be joined together in a position in which their stubs (6) and pockets (7) partially overlap.

20 Claims, 4 Drawing Sheets

CONNECTING CHAIN LINK

BACKGROUND OF THE INVENTION

The invention relates to a connecting chain link for link chains having two connecting-link parts whose ends, which are connected to each other via a respective longitudinal web, are pushed one into the other in the closed position in such a manner that a respective, essentially U-shaped retaining web of one end grips into a respective, essentially U-shaped retaining groove at the other end.

German Utility Model 74 35 053 discloses a connecting chain link of the abovementioned type. In the case of the known connecting chain link, in order to open and close the connecting link, comparatively large displacement paths have to be covered and there is no space for these, particularly if—as is disclosed in DE 298 11 332 U1 in the central region of the longitudinal limbs of the connecting link there are projections which protrude into the interior of the connecting link. In the latter case, in order to make it possible for the connecting link to be opened and closed, the ends of the connecting link are only held together by short, sickle-shaped retaining webs gripping into identically shaped retaining grooves assigned to them. It is obvious that there is a restriction on the transverse forces which can be transmitted by the short projections. In order at least partially to compensate for the loss in strength in the face of transverse forces, in the second known connecting chain link the projections are designed as hooks gripping one into another.

SUMMARY OF THE INVENTION

The invention is based on the object of providing a connecting chain link of the type under consideration, in whose fitting and removal the connecting-link parts have only to be displaced with respect to each other by comparatively short amounts in the direction of the longitudinal axis of the connecting link, without the shortening of the displacement path having to be bought at the price of a serious limitation of the stressability of the ends of the connecting chain link by means of transverse forces, and without additional precautions having to be taken in the region of the projections in order to absorb transverse forces. This object is achieved in the case of a connecting chain link of the generic type by, in the region of its two limbs, the particular retaining web consisting of two sections which are separated from each other by a clearance, by the wall facing the dividing gap of the connecting link and belonging to the particular retaining groove being provided with a respective recess in the region of the groove limbs, and by the size and position of the recesses and of the clearances being matched to one another in such a manner that the connecting-link parts can be separated from each other and joined together again in an intermediate position, in which they are merely partially pushed together, by means of a movement directed perpendicularly to the longitudinal axis of the connecting link.

The connecting chain link according to the invention provides the advantage that comparatively large transverse forces can be transmitted in the region of its ends even if the connecting-link parts have projections in the region of their longitudinal limbs, or if they are used in order to connect sections of chain strands having links of a small pitch.

BRIEF DESCRIPTION OF THE DRAWINGS

Further details and features of the invention emerge from the subclaims and from the description below of an exemplary embodiment illustrated in the attached drawing, in which:

DESCRIPTION OF THE BEST MODES FOR CARRYING OUT THE INVENTION

Figure 1:
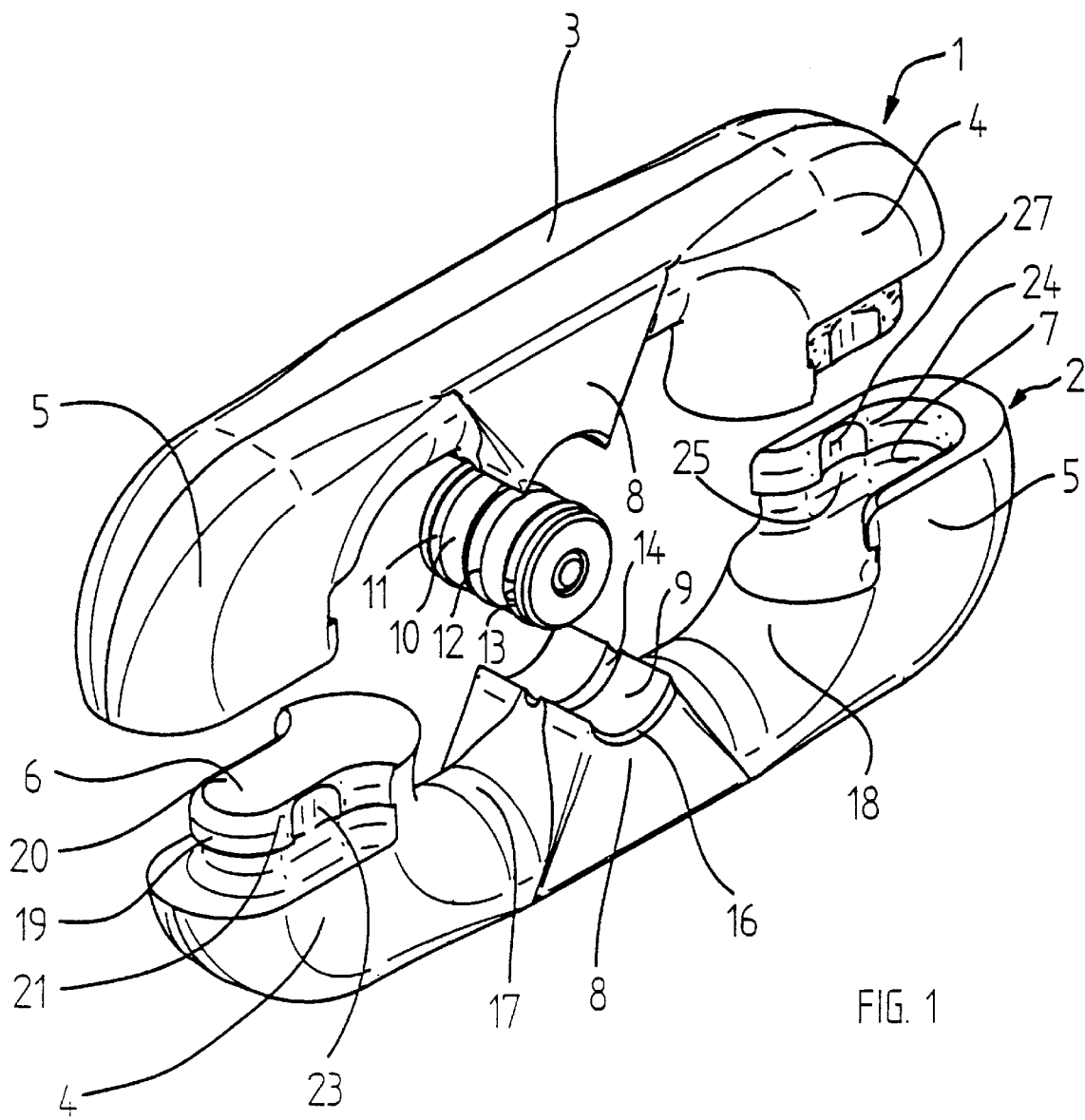
FIG. 1 shows the perspective illustration of the parts, separated from each other, of a first connecting chain link.
Figure 2:
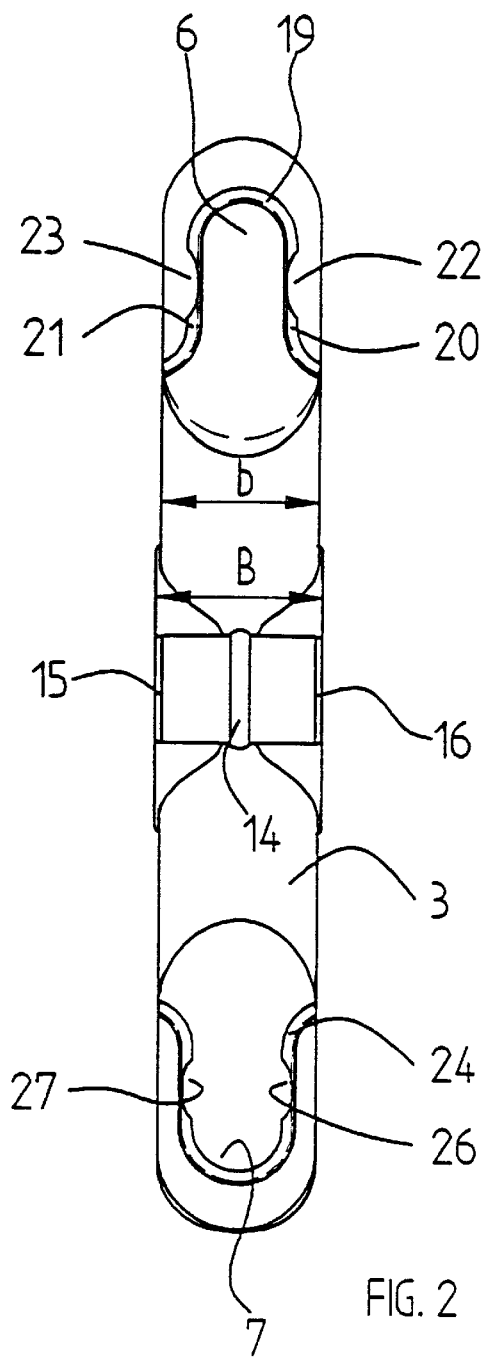
FIG. 2 shows the plan view of the inside of one of the two connecting-link parts according to FIG. 1.
Figure 3:
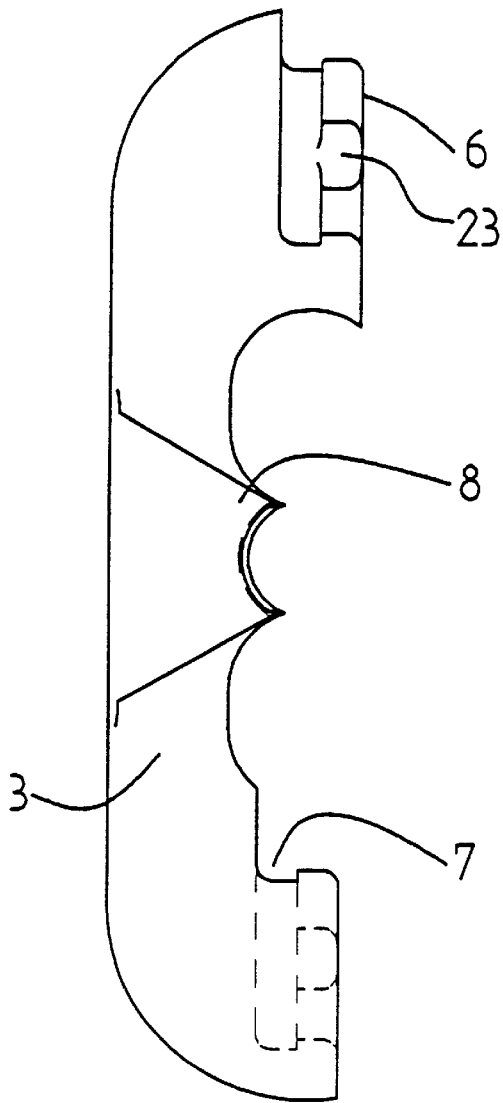
FIG. 3 shows the side view of the connecting-link part according to FIG. 2.
Figure 4:
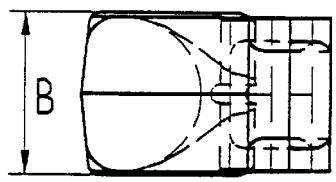
FIG. 4 shows the end view of the connecting-link part according to FIGS. 2 and 3.

In FIG. 1, 1 and 2 are general designations of two connecting-link parts which are of identical design and are arranged rotationally symmetrically with respect to each other. Each of the two connecting-link parts 1 and 2 has two ends 4 and 5 which are connected to each other by a longitudinal web 3 and are essentially designed in the form of a quarter circle. Each connecting-link part 1 or 2 is provided with a stub 6 at its one end 4, and at its other end 5 with a pocket 7 to hold the stub 6 of the other connecting-link part in each case. In the centre of the longitudinal limbs 3 there are projections 8 which are directed towards the interior of the connecting chain link, increase the cross-section of the longitudinal limbs 3 at the abovementioned location and form bearings having shell-shaped supporting surfaces 9 for a central locking element 10. The distance between those side surfaces of the projections 8 which face the ends 4 and 5 decreases towards those ends of the projections which form the supporting surfaces 9, i.e. the projections 8 have a cross-section tapering towards the centre of the connecting link. In the closed position of the connecting link, the supporting surfaces 9 enclose the bolt-shaped locking element 10 over at least 220° of its circumference. The locking element 10 is provided with three snap rings 11, 12 and 13 which are guided in grooves around its circumference and the central one 12 of which, in the closed position of the connecting link, snaps into a slot 14 made in the supporting surface 9, while the two outer ones 11 and 13 bear against the supporting surfaces 9 of the projections 8. The snap rings 11 to 13 prevent both axial and tilting movements of the locking element 10 in the assembled state of the connecting link. The sloping surfaces 15 and 16 facilitate the introduction of the locking element 10 into the holder formed by the projections 8.

When connecting sections of chain strands with the aid of the connecting chain link illustrated, the end links of the sections of chain strands are first of all fitted into the hollows 17, 18 in the lower connecting-link part 2. After that, the upper connecting-link part 1 is pressed against the lower connecting-link part 2, in a position which is offset with respect to the lower connecting-link part 2 in the direction of the longitudinal axis of the connecting chain link, in order finally, by means of a relative movement between the connecting-link parts in the direction of the longitudinal axis of the connecting link, to be pushed into an end position which permits the locking element 10 to be put in its place. It stands to reason that, at a given pitch of the links of the sections of chain strands to be connected to one another, the distance by which the connecting-link parts 1, 2 can be displaced in the direction of the longitudinal axis of the connecting link is more restricted than is the case when connecting chain links of a similar type which do not have projections directed into the interior of the connecting link.

Figure 5:
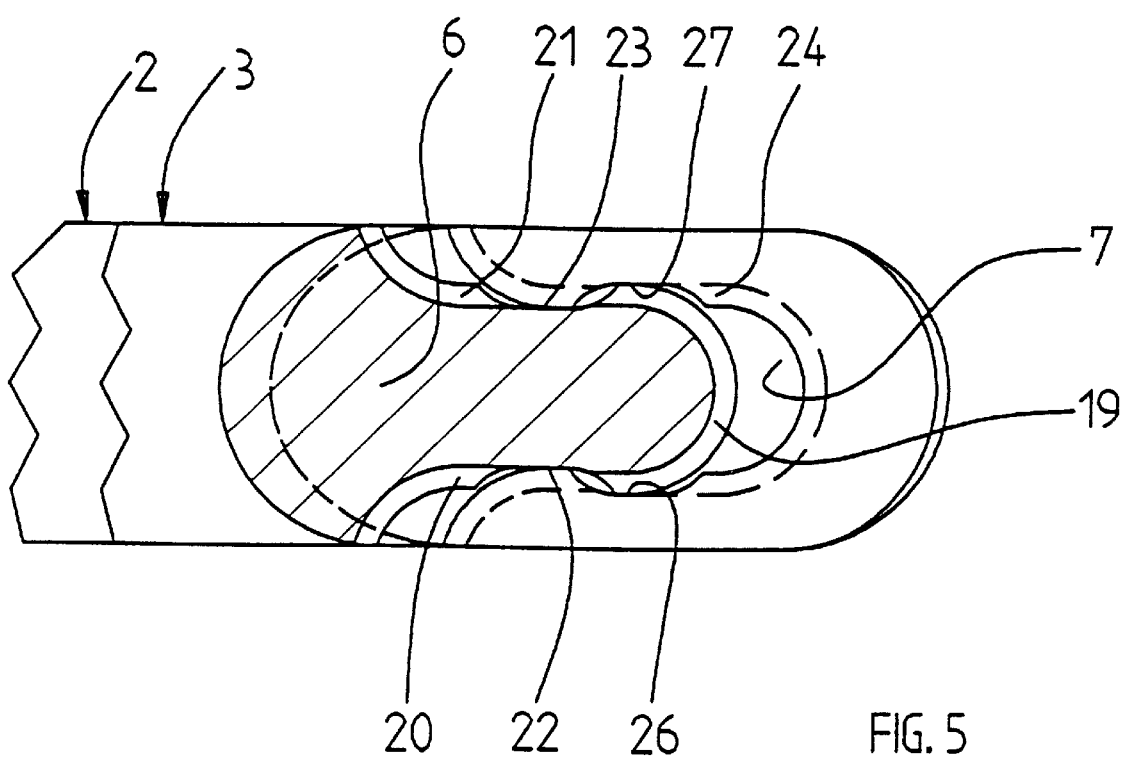
FIG. 5 shows, on an enlarged scale and partially in section, the right-hand ends of the connecting-link parts 1 and 2 in an intermediate position when the connecting link is closed.
Figure 6:
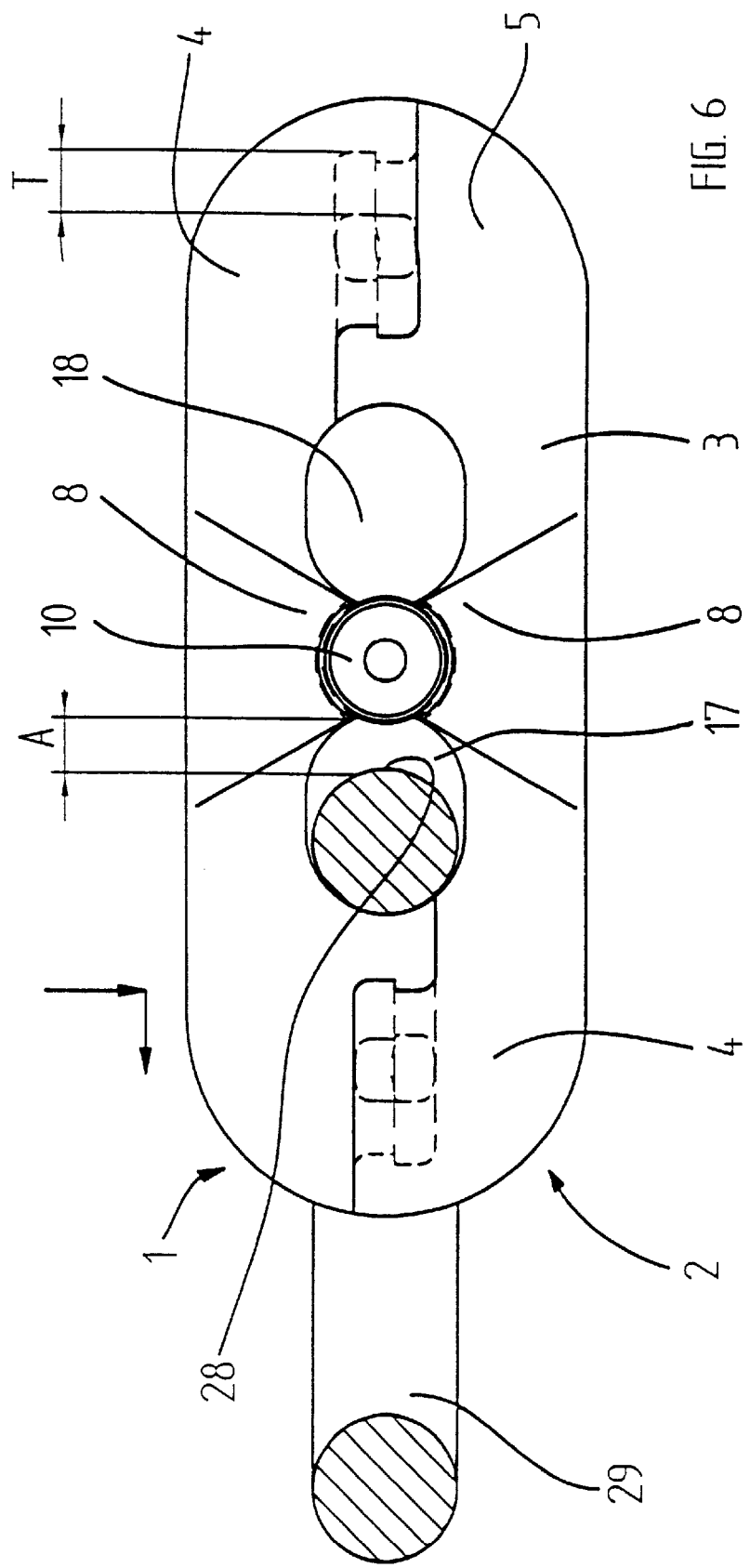
FIG. 6 shows a side view of the connecting link.

In order to be able to absorb comparatively large transverse forces in the region of the curved ends of the connecting chain link in spite of the short displacement path available for the connecting-link parts in the direction of the longitudinal axis of the connecting chain link, the stubs 6 are provided with an essentially U-shaped retaining web 19 which, in the region of its limbs 20, 21 running parallel to each other, has clearances 22, 23 which divide the limbs 20, 21 into two sections in each case. At the same time, the wall 24, which faces the dividing gap of the connecting chain link and which belongs to a U-shaped retaining groove 25 of the pocket 7, is provided with recesses 26, 27. The size and position of the clearances 22, 23 and of the recesses 26, 27 are matched to one another in such a manner that the connecting-link parts 1, 2 can be joined together in the intermediate position which has already been mentioned above and in which their stubs 6 and the pockets 7 partially overlap, by means of a movement which is directed perpendicularly to the longitudinal axis of the connecting link, in order subsequently to be able to be transferred into their end position by means of a displacement movement in the direction of the longitudinal axis. Consequently, not only is a projection arranged in the apex of the stub available in order to transmit transverse forces, but so too is the majority of the retaining web 19. For a better understanding of the facts, FIG. 5 shows, on an enlarged scale, the intermediate position in which the stub 6, illustrated cut-away, is pushed into the pocket 7 perpendicularly to the longitudinal axis of the connecting link in the plane running through the longitudinal webs 3 of the two connecting-link halves 1, 2.

The displacement path corresponding to the insertion depth T of the retaining webs 19 into the retaining groove 25 in the direction of the longitudinal axis of the connecting chain link has inevitably to be smaller than the distance A between the apex 28 of the rounded head of a chain link 29 fitted into the connecting link and the corner points of the holder for the locking element 10.

What is claimed is:

1. Connecting chain link for link chains having two connecting-link parts, each of said connecting-link parts having two ends and a longitudinally oriented web connecting said two ends; one of said ends of each of said connecting-link parts comprising an essentially U-shaped retaining web, and the other of said ends of each of said connecting-link parts comprising an essentially U-shaped retaining groove; said essentially U-shaped retaining web of one of said connecting-link parts being adapted to be received in said essentially U-shaped retaining groove of the other of said connecting-link parts for joining said two connecting-link parts together; characterized in that said retaining web (19) comprises two sections, said two sections being separated from each other by a clearance (22, 23); said retaining groove (25) defining a wall (24), and said wall defining a recess (26, 27); wherein the size and position of said recess (26, 27) and the size and position of said clearance (22, 23) are selected such that said two connecting-link parts (1, 2) are separable from each other and joinable to each other in an intermediate position between a fully locked position and a fully separated position by relative movement of said connecting link parts in a direction perpendicular to a longitudinal axis of at least one of said connecting-link parts.

2. Connecting chain links according to claim 1, characterized in that the longitudinal webs (3) of the connecting-link parts (1, 2) are each provided with a prolection (8) which extends towards an interior portion of the connecting chain link for forming a bearing for a locking element (10).

3. Connecting chain link according to claim 2, characterized in that mutually facing ends of each of the projections (8) extending from said respective connecting-link parts form partially cylindrical supporting surfaces (9) for said locking element (10).

4. Connecting chain link according to claim 3, characterized in that the supporting surfaces (9) enclose the locking element (10) over at least 220° of the circumference of the locking element (10).

5. Connecting chain link according to claim 3, characterized in that the locking element (10) has a central groove, and a first snap ring (12) received in said central groove; said supporting surfaces (9) each defining at least one snap-in slot (14) for receiving therein said first snap ring (12) for securing the position of said locking element (10) in an axial orientation relative to said bearing formed by said projections (8).

6. Connecting chain link according to claim 5, characterized in that the locking element (10) has first and second ends, a second snap ring (11, 13) mounted to said locking element (10) proximate to said first end, and a third snap ring (11, 13) mounted to said locking element (10) proximate to said second end.

7. Connecting chain link according to claim 3, characterized in that each of said projections (8) has side surfaces which face respectively towards said ends of the connecting-link parts (1, 2), wherein the distance between said side surfaces decreases in a direction towards the end of said projection (8) forming said supporting surface (9).

8. Connecting chain link according to claim 2, characterized in that each of the projections (8) has a width (B) which is larger than the width (b) of the ends (4, 5) of the connecting-link parts (1, 2).

9. Connecting chain link according to claim 4, characterized in that the locking element (10) has a central groove, and a first snap ring (12) received in said central groove; said supporting surfaces (9) each defining at least one snap-in slot (14) for receiving therein said first snap ring (12) for securing the position of said locking element (10) in an axial orientation relative to said bearing formed by said projections (8).

10. Connecting chain link according to claim 9, characterized in that the locking element (10) has first and second ends, a second snap ring (11, 13) mounted to said locking element (10) proximate to said first end, and a third snap ring (11, 13) mounted to said locking element (10) proximate to said second end.

11. Connecting chain link according to claim 4, characterized in that each of said projections (8) has side surfaces which face respectively towards said ends of the connecting-link parts (1, 2), wherein the distance between said side surfaces decreases in a direction towards the end of said projection (8) forming said supporting surface (9).

12. Connecting chain link according to claim 5, characterized in that each of said projections (8) has side surfaces which face respectively towards said ends of the connecting-link parts (1, 2), wherein the distance between said side surfaces decreases in a direction towards the end of said projection (8) forming said supporting surface (9).

13. Connecting chain link according to claim 6, characterized in that each of said projections (8) has side surfaces which face respectively towards said ends of the connecting-link parts (1, 2), wherein the distance between said side surfaces decreases in a direction towards the end of said projection (8) forming said supporting surface (9).

14. Connecting chain link according to claim 3, characterized in that each of the projections (8) has a width (B) which is larger than the width (b) of the ends (4, 5) of the connecting-link parts (1, 2).

15. Connecting chain link according to claim 4, characterized in that each of the projections (8) has a width (B) which is larger than the width (b) of the ends (4, 5) of the connecting-link parts (1, 2).

16. Connecting chain link according to claim 5, characterized in that each of the projections (8) has a width (B) which is larger than the width (b) of the ends (4, 5) of the connecting-link parts (1, 2).

17. Connecting chain link according to claim 6, characterized in that each of the projections (8) has a width (B) which is larger than the width (b) of the ends (4, 5) of the connecting-link parts (1, 2).

18. Connecting chain link according to claim 7, characterized in that each of the projections (8) has a width (B) which is larger than the width (b) of the ends (4, 5) of the connecting-link parts (1, 2).

19. Connecting chain link according to claim 9, characterized in that each of the projections (8) has a width (B) which is larger than the width (b) of the ends (4, 5) of the connecting-link parts (1, 2).

20. Connecting chain link according to claim 10, characterized in that each of the projections (8) has a width (B) which is larger than the width (b) of the ends (4, 5) of the connecting-link parts (1, 2).

* * * * *